US011845370B2

(12) United States Patent
Lorey et al.

(10) Patent No.: US 11,845,370 B2
(45) Date of Patent: Dec. 19, 2023

(54) VEHICLE SEAT WITH SEAT DEPTH ADJUSTMENT

(71) Applicant: GRAMMER Aktiengesellschaft, Ursensollen (DE)

(72) Inventors: Konstantin Lorey, Schmidgaden (DE); Michael Klemm, Amberg (DE)

(73) Assignee: GRAMMER AKTIENGESELLSCHAFT, Ursensollen (DE)

( * ) Notice: Subject to any disclaimer, the term of this patent is extended or adjusted under 35 U.S.C. 154(b) by 0 days.

(21) Appl. No.: 17/848,555

(22) Filed: Jun. 24, 2022

(65) Prior Publication Data
US 2022/0410776 A1    Dec. 29, 2022

(30) Foreign Application Priority Data

Jun. 25, 2021   (DE) .......................... 102021116551.2

(51) Int. Cl.
  *B60N 2/02*  (2006.01)
  *B60N 2/68*  (2006.01)
  *B60N 2/04*  (2006.01)
(52) U.S. Cl.
  CPC ............. *B60N 2/68* (2013.01); *B60N 2/0284* (2013.01); *B60N 2/04* (2013.01)
(58) Field of Classification Search
  CPC .................................................... B60N 2/0284
  See application file for complete search history.

(56) References Cited

U.S. PATENT DOCUMENTS

| 5,370,444 A | 12/1994 | Stulik |
| 2005/0061941 A1 | 3/2005 | McMains |
| 2007/0132293 A1* | 6/2007 | Moriyama ............. B60N 2/067 |
| | | 297/344.1 |
| 2007/0274616 A1 | 11/2007 | Schrimpl et al. |
| 2009/0212190 A1 | 8/2009 | Dahlbacka et al. |
| 2014/0021759 A1 | 1/2014 | Peterson et al. |
| 2019/0135139 A1* | 5/2019 | Ioppolo ................ B60N 2/0284 |
| 2019/0217745 A1* | 7/2019 | Tsukamoto .......... B60N 2/5825 |
| 2020/0247277 A1 | 8/2020 | Weir et al. |
| 2021/0114496 A1* | 4/2021 | Tait .......................... B60N 2/62 |

FOREIGN PATENT DOCUMENTS

| CN | 108263249 | 7/2018 |
| DE | 2948585 | 6/1980 |
| DE | 19624979 | 1/1998 |

(Continued)

OTHER PUBLICATIONS

Official Action with machine translation for Germany Patent Application No. 102021116551.2, dated May 25, 2022, 10 pages.

(Continued)

*Primary Examiner* — Timothy J Brindley
(74) *Attorney, Agent, or Firm* — Sheridan Ross P.C.

(57) ABSTRACT

The invention relates to a vehicle seat, the vehicle seat having a seat part frame and a seat depth adjustment with a seat depth adjustment element, the seat depth adjustment element being displaceable relative to the seat part frame, wherein a first connecting element is provided and designed to connect the seat depth adjustment element to the seat part frame and to guide the seat depth adjustment element relative to the seat part frame.

13 Claims, 7 Drawing Sheets

(56) References Cited

FOREIGN PATENT DOCUMENTS

| | | |
|---|---|---|
| DE | 102016110404 | 12/2017 |
| DE | 102018123873 | 3/2019 |
| DE | 102019216331 | 4/2021 |
| DE | 102019216331 A1 * | 4/2021 |
| EP | 0962170 | 12/1999 |
| JP | S58-108924 | 7/1983 |
| JP | S58-174337 | 11/1983 |
| JP | 2010-94455 | 4/2010 |

OTHER PUBLICATIONS

Official Action for India Patent Application No. 202224036314, dated Jan. 18, 2023, 6 pages.

* cited by examiner

Fig. 6B

VEHICLE SEAT WITH SEAT DEPTH ADJUSTMENT

CROSS-REFERENCE TO RELATED APPLICATION

This application claims the benefit of German Patent Application No. 10 2021 116 551.2 filed Jun. 25, 2021, the contents of which are incorporated herein by reference in its entirety.

FIELD

The invention relates to a vehicle seat with a seat frame and a seat depth adjustment with a seat depth adjustment element, wherein the seat depth element is displaceable relative to the seat frame.

BACKGROUND

Prior art vehicle seats with seat depth adjustments are known to adjust the seat depth of a vehicle seat, in particular a seat surface on which a person can sit.

Such seat depth adjustments are guided, for example, by means of several rod elements so that the corresponding seat depth adjustment element is guided along these rod elements on the rod elements. The rod elements are rigidly connected to the seat frame. In terms of rigidity and load capacity, the design is suitable for normal use in traffic, but not for off-road use. A corresponding adaptation is associated with a considerable additional effort, in particular in order to design the rod elements in such a way that they are not separated from the seat frame even under heavy loads.

SUMMARY

It is therefore the object of the present invention to provide a vehicle seat by means of which the above-mentioned problems can be overcome and by means of which a number of required components can be reduced.

This object is solved by a vehicle seat with the features of patent claim 1 and by a vehicle seat with the features of patent claim 10. Advantageous embodiments of the invention can be found in the dependent patent claims.

A central idea of the present invention is to provide a vehicle seat, the vehicle seat comprising a seat part frame and a seat depth adjustment comprising a seat depth adjustment member, the seat depth adjustment member being displaceable relative to the seat part frame, wherein a first connecting member is provided and adapted to connect the seat depth adjustment member to the seat part frame and to guide the seat depth adjustment member relative to the seat part frame.

The seat part frame is to be understood as the frame of the seat part, wherein the seat part represents the part of the vehicle seat on which a person can sit. Preferably, the seat part has a cushion and/or a cover on its upper side.

According to the invention, it is provided that the seat depth adjustment element is displaceable, preferably linearly displaceable, relative to the seat part frame. Particularly preferably, the displacement is such that the seat depth adjustment element is translationally displaceable. Preferably, the seat depth adjustment element is displaceable in a longitudinal direction, wherein the longitudinal direction can correspond to the longitudinal direction of the vehicle seat. By displacing the seat depth adjustment element relative to the seat part frame, the seat depth of the vehicle seat, in particular of the seat part, can be adjusted in that the seat surface can be changed by the seat depth adjustment element.

According to a preferred embodiment, a seat depth adjustment travel is up to 100 mm, more preferably 80 mm, and particularly preferably 60 mm. A seat depth adjustment travel means the distance by which the seat depth adjustment element can be displaced in relation to the seat part frame. This means that the seat depth adjustment element can have a minimum displacement position and a maximum displacement position, wherein each position can be taken between the displacement positions. Between the minimum and maximum displacement positions, the seat depth adjustment element travels the displacement path.

According to the invention, it is therefore envisaged that no more rod elements, as known from the state of the art, are provided for guidance, but only at least one connecting element by means of which, on the one hand, the seat depth adjustment element is connected to the seat part frame and by means of which the seat depth adjustment element can be guided with respect to the seat part frame. Thus, a double function can be attributed to the connecting element.

Particularly preferably, the seat depth adjustment element is made of a plastic, wherein preferably the seat depth adjustment element can be manufactured in an injection moulding process.

According to a particularly preferred embodiment, it is provided that the seat part frame comprises a first elongated hole, wherein the first connecting element extends through the first elongated hole and wherein the first connecting element is guided by the first elongated hole.

Preferably, the first elongated hole is provided as a gap or recess of the seat part frame, that is, the first elongated hole is an integral part of the seat part frame, so that additional guides or the like extending beyond the seat part frame, as known from the prior art, can be dispensed with.

Particularly preferably, the first elongated hole is designed to extend in the longitudinal direction so that linear guidance of the seat depth adjustment element in the longitudinal direction is possible.

Particularly preferably, the first connecting element is formed extending perpendicularly to the extension of the first elongated hole, preferably extending perpendicularly to the longitudinal direction.

According to a further preferred embodiment, it is provided that the first connecting element is formed from a first connecting element part and a second connecting element part, wherein the first connecting element part and the second connecting element part are connected to one another at least non-positively, preferably positively. It is conceivable here that the first connecting element part and the second connecting element part are screwed, riveted or the like to one another.

Further preferably, it may be provided that the first connecting element part or the second connecting element part is overmoulded with plastic, wherein preferably the first connecting element part or the second connecting element part is overmoulded by the seat depth adjustment element.

According to a further preferred embodiment, it may be provided that the first connecting member comprises a first connecting portion and a second connecting portion, wherein further preferably the first connecting portion is in direct contact with the seat depth adjusting member and the second connecting portion is in direct or indirect contact with the seat part frame, wherein in particular indirect contact is preferred.

Through the connecting portions, a good connection can be achieved between the components first connecting element, seat depth adjustment element and seat part frame.

The connection is, as described according to the invention, such that a displacement of the seat depth adjustment element to the seat part frame is possible.

According to a particularly preferred embodiment, it can be provided that a first spring unit, preferably a disc spring unit, is provided which at least partially surrounds the first connecting element in the circumferential direction, wherein the first spring unit is operatively connected to the seat part frame and to the first connecting element at least in such a way that a spring force acts on the first connecting element and on the seat part frame.

Particularly preferably, the first spring unit is rigidly connected to the first connecting element.

Further preferably, the first spring unit is designed such that the spring force acts in a height direction, which may correspond to the vehicle seat height direction or the extension direction of the first connecting element. Preferably, the first spring unit is designed in such a way that the spring force acts in a height direction, which can correspond to the vehicle seat height direction or the extension direction of the first connecting element, and in a width direction.

Particularly preferably, the first spring unit is connected to the second connecting section of the first connecting element and to the seat part frame, so that tolerance compensation is possible in the direction perpendicular to the first elongated hole and a good guidance and displaceability of the seat depth adjustment element in the first elongated hole is possible. Further preferably, the first spring unit can be designed in such a way that tolerance compensation of the first connecting element with respect to the elongated hole is also possible. Preferably, the first spring element extends through the first elongated hole and is in operative contact with the first connecting element and the first elongated hole, as seen in the longitudinal direction.

According to a further preferred embodiment, it is provided that the first spring unit is made of a plastic.

Particularly preferably, the plastic has elastic properties so that the tolerance compensation between the first connecting element and the seat part frame is possible. Further preferably, the first spring element can be used to adjust a strength of the connection between the seat part frame and the first connecting element, for example depending on how the first connecting element part and the second connecting element part of the first connecting element are connected to each other, for example how far the connecting element parts are screwed into each other.

Particularly preferably, the first spring unit has sliding properties so that a displacement of the seat depth adjustment element to the seat part frame can be further improved. It is conceivable, for example, that the material of the first spring unit has the sliding properties.

According to a further preferred embodiment, it can be provided that a second connecting element is provided, which is provided and designed to connect the seat depth adjustment element to the seat part frame and to guide the seat depth adjustment element with respect to the seat part frame, and wherein the seat part frame has a second elongated hole, wherein the second connecting element extends through the second elongated hole and wherein the second connecting element is guided by the second elongated hole.

Further preferably, it may be provided that a second connecting element and a third connecting element are provided, which are provided and configured to connect the seat depth adjustment element to the seat part frame and to guide the seat depth adjustment element relative to the seat part frame, and wherein the seat part frame has a second elongated hole and a third elongated hole, wherein the second connecting member extends through the second elongated hole and wherein the second connecting member is guided by the second elongated hole, wherein the third connecting member extends through the third elongated hole and wherein the third connecting member is guided by the third elongated hole.

The explanations regarding the first connecting element, the first elongated hole, the corresponding arrangements and embodiments can also be applied to the second connecting element, the third connecting element as well as the second elongated hole and the third elongated hole.

Also conceivable are n-th connecting elements and n-th elongated holes, which can be provided in addition to what has been described above, whereby the designs and configurations of the first connecting element and the first elongated hole are also conceivable here.

It is also conceivable that the first connecting element differs in its embodiment from the embodiments of the other connecting elements. The same applies to the designs of the elongated holes in relation to each other, and correspondingly to the connections and arrangements.

By providing several connecting elements and several elongated holes, a guidance of the seat depth adjustment element in relation to the seat part frame can be improved, as for example possible rotations or other unwanted movements can be excluded.

It is particularly preferred that the first connecting element is designed as a fixed bearing and the second connecting element and the third connecting element are designed as a floating bearing.

The design of the first connecting element as a fixed bearing is therefore such that only one single degree of freedom is provided, namely the movement within the first elongated hole in the longitudinal direction.

Since the first connecting element is designed as a fixed bearing, it can be advantageous to design the second connecting element and the third connecting element as a floating bearing in order to be able to compensate for possible manufacturing tolerances of the components. The respective floating bearing has two degrees of freedom, namely on the one hand as movement within the first elongated hole in longitudinal direction and additionally a movement perpendicular to the longitudinal direction in a width direction, which preferably corresponds to the vehicle seat width direction. This means that the respective connecting element can have a distance to the seat part frame as seen in the width direction.

Particularly preferably, the first elongated hole, the second elongated hole and, if applicable, the third elongated hole can be arranged parallel to each other.

This also makes it possible to further improve the displacement of the seat depth adjustment element in relation to the seat part frame.

The underlying problem is also solved by a vehicle seat, the vehicle seat having a seat part frame and a seat depth adjustment with a seat depth adjustment element, the seat depth adjustment element being displaceable relative to the seat part frame, the seat part frame having a first elongated hole and the seat depth adjustment element having a first guide element, wherein the first guide member is configured to be guided in the first elongated hole, and wherein a first connecting member is further provided, wherein the first connecting member extends through the first elongated hole and connects the seat depth adjusting member to the seat part frame.

Particularly preferably, the first guide element is designed in such a way that it is complementary to the first elongated hole, at least when viewed in the width direction, so that no free movement is possible in this direction. The first guide element is therefore preferably designed as a fixed bearing.

Preferably, the first guide member is an integral part of the seat depth adjustment member, meaning that the first guide member and the seat depth adjustment member are connected to each other in such a way that the seat depth member is integral or one-piece with the first guide member.

According to a preferred embodiment, it is provided that the first guide element comprises a first through opening through which the first connecting element is at least partially received.

According to a further preferred embodiment, it is provided that a first spring unit, preferably a disc spring unit, is provided, which at least partially surrounds the first connecting element in the circumferential direction, wherein the first spring unit is operatively connected to the seat part frame and to the first connecting element at least in such a way that a spring force acts on the first connecting element and on the seat part frame. Preferably, the spring force acts only in the height direction or in the extension direction of the first connecting element. The first spring unit is designed and provided so that a spring force only acts in the height direction or in the extension direction of the first connecting element.

Particularly preferably, the first spring unit is connected to the second connecting portion of the first connecting element and to the seat part frame, so that tolerance compensation is possible in the direction perpendicular to the first elongated hole and good guidance and displaceability of the seat depth adjustment element in the first elongated hole is possible. Further preferably, the first spring unit can be designed in such a way that tolerance compensation of the first connecting element with respect to the elongated hole is also possible. Preferably, the first spring element extends through the first elongated hole and is in active contact with the first connecting element and the first elongated hole, as seen in the longitudinal direction.

According to a further preferred embodiment, it is provided that the first spring unit is made of a plastic.

Particularly preferably, the plastic has elastic properties so that the tolerance compensation between the first connecting element and the seat part frame is possible. Further preferably, the first spring element can be used to adjust a strength of the connection between the seat part frame and the first connecting element, for example depending on how the first connecting element part and the second connecting element part of the first connecting element are connected to each other, for example how far the connecting element parts are screwed into each other.

Particularly preferably, the first spring unit has sliding properties so that a displacement of the seat depth adjustment element to the seat part frame can be further improved. It is conceivable, for example, that the material of the first spring unit has the sliding properties.

According to a further preferred embodiment, it can be provided that a second connecting element is provided, which is provided and designed to connect the seat depth adjustment element to the seat part frame and to guide the seat depth adjustment element with respect to the seat part frame, and wherein the seat part frame has a second elongated hole, wherein the second connecting element extends through the second elongated hole and wherein the second connecting element is guided by the second elongated hole.

Further preferably, it may be provided that a second connecting element and a third connecting element are provided, which are provided and configured to connect the seat depth adjustment element to the seat part frame and to guide the seat depth adjustment element relative to the seat part frame, and wherein the seat part frame has a second elongated hole and a third elongated hole, wherein the second connecting member extends through the second elongated hole and wherein the second connecting member is guided by the second elongated hole, wherein the third connecting member extends through the third elongated hole and wherein the third connecting member is guided by the third elongated hole.

According to a further preferred embodiment, it is provided that a second spring element is provided, wherein the second spring element has a first end and a second end, wherein the first end is fixedly connected to the seat depth adjustment element and the second end is in operative contact with the second elongated hole in such a way that a tolerance of the seat depth adjustment element to the second elongated hole can be compensated.

According to a further preferred embodiment, a second spring element and a third spring element are provided, wherein the second spring element has a first end and a second end, wherein the first end is fixedly connected to the seat depth adjustment element and the second end is in operative contact with the second elongated hole such that a tolerance of the seat depth adjustment element to the second elongated hole can be compensated, such that a tolerance of the seat depth adjustment element to the second elongated hole can be compensated, and wherein the third spring element has a first end and a second end, wherein the first end is fixedly connected to the seat depth adjustment element and the second end is in operative contact with the third elongated hole such that a tolerance of the seat depth adjustment element to the third elongated hole can be compensated.

The second spring element and the third spring element are designed in such a way that they are designed as a floating bearing, whereas the first guide element is designed as a fixed bearing. The second spring element and the third spring element are designed in such a way that they allow movement in the width direction in addition to the movement along the corresponding elongated hole.

According to a preferred embodiment, the first connecting element and, if applicable, the further connecting elements are made of steel or the like.

Further advantageous embodiments result from the subclaims.

BRIEF DESCRIPTION OF THE DRAWINGS

Further aims, advantages and usefulness of the present invention can be seen from the following description in conjunction with the drawing. Hereby show.

DETAILED DESCRIPTION

In the figures, identical components are to be understood with the corresponding reference signs. For the sake of clarity, some components may not have a reference sign in some figures, but have been designated elsewhere.

Figure 1A:
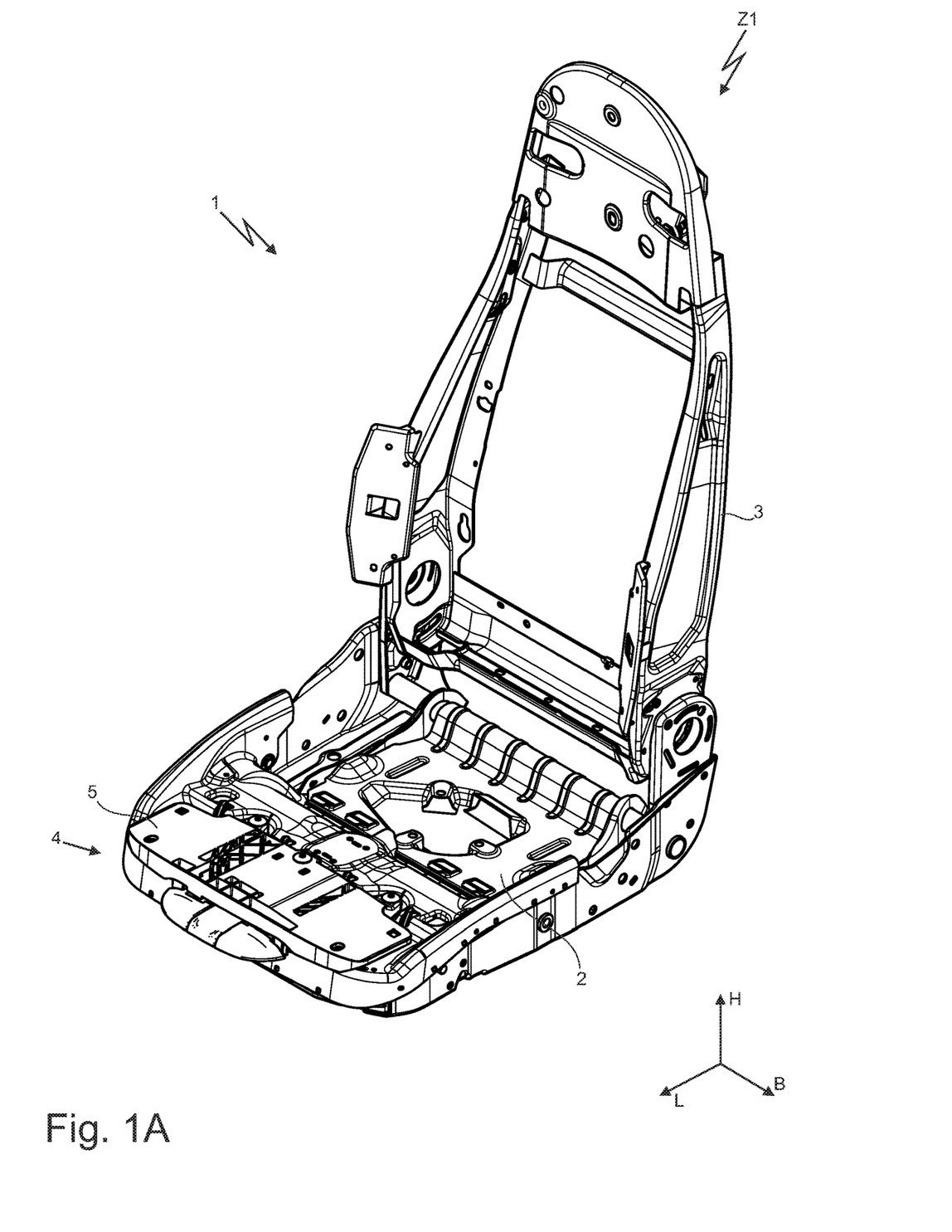
FIG. 1A Vehicle seat with seat depth adjustment according to a preferred embodiment in a first state.
Figure 1B:
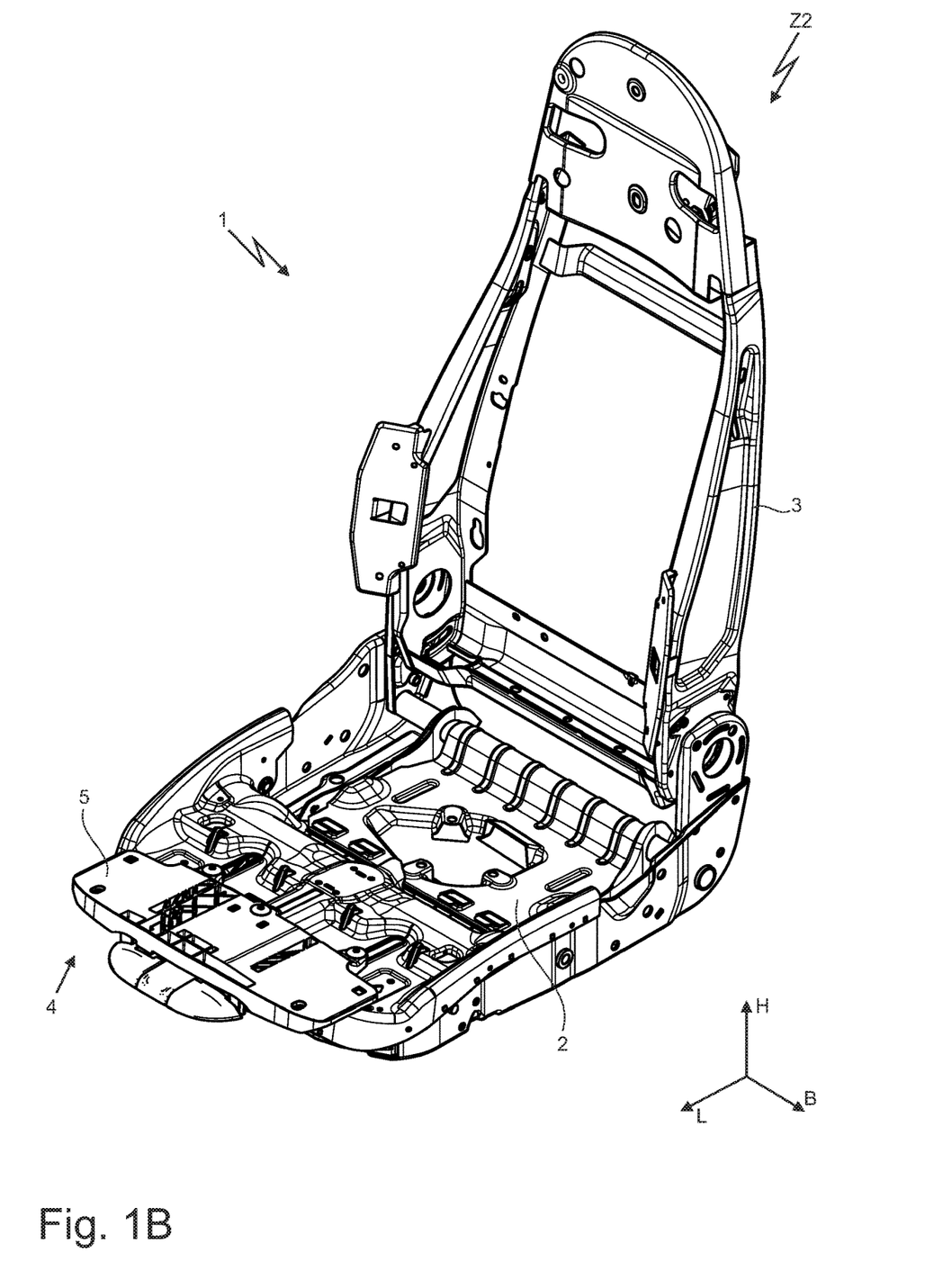
FIG. 1B Vehicle seat according to FIG. 1A in a second state.

In FIG. 1A a vehicle seat 1 according to a preferred embodiment is shown in a first state Z1 and in the figure in a second state Z2. The states Z1, Z2 refer to the position of a seat depth adjustment element 5 of a seat depth adjustment 4, wherein the first state Z1 describes a state in which the seat depth adjustment element 5 is shown in its minimum position, i.e. in the position in which the available seat surface is minimum. Accordingly, the second state Z2 describes a state in which the seat depth adjustment element 5 is in its maximum position, i.e. in the position in which the available seat surface is at a maximum. The second state Z2 is achieved by a forward displacement of the seat depth adjustment element 5 in a longitudinal direction L, and the first state Z1 is achieved by a rearward displacement of the seat depth adjustment element 5 in the longitudinal direction L, wherein the seat depth adjustment element 5 is maximally rearwardly displaced in the first state Z1 and maximally forwardly displaced in the second state Z2. A displacement of the seat depth adjustment element is to be understood relative to a seat part frame 2.

The vehicle seat 1 has the seat part frame 2 and preferably a backrest frame 3. Furthermore, the vehicle seat 1 comprises the seat depth adjustment 4 with the seat depth adjustment element 5.

Figure 2A:
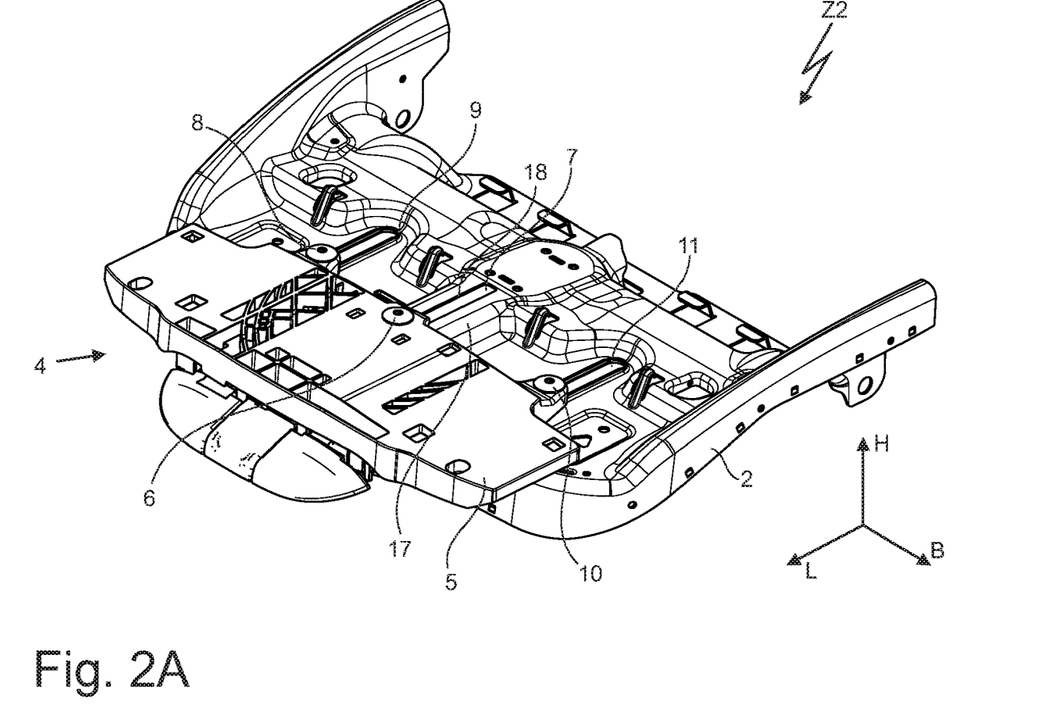
FIG. 2A Seat part frame and seat depth adjustment of the vehicle seat according to FIG. 1B.
Figure 2B:
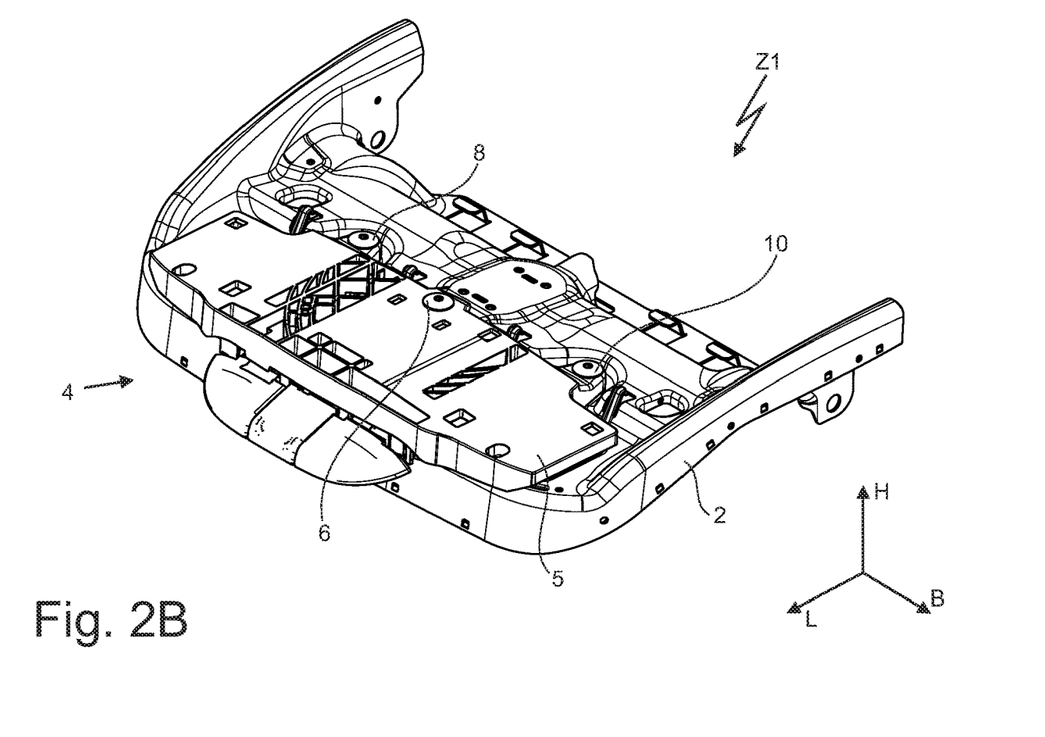
FIG. 2B Seat part frame and seat depth adjustment of the vehicle seat according to FIG. 1A.

FIGS. 2A and 2B show a perspective view of the seat sub-frame 2 with the seat depth adjustment 4, whereby the second state Z2 is shown in FIG. 2A and the first state Z1 is shown in FIG. 2B.

Preferably, it may be provided that the seat depth adjustment element 5 is formed at least partially complementary to the seat part frame 2, so that the guidance of the seat depth element 5 can be improved. Particularly preferably, it may be provided that a seat depth adjustment element guide 17 is provided, which is arranged centrally with respect to the seat depth adjustment element 5. Preferably, the seat depth adjustment element guide 17 is prism-shaped, whereby the first elongated hole 7 can be formed on an upper side 18.

According to FIGS. 2A and 2B, a second connecting element 8 and a third connecting element 10 are shown, wherein the second connecting element 8 is guided in a second elongated hole 9 and the third connecting element 10 is guided in a third elongated hole 11. Preferably, the first elongated hole 7 is arranged above the second elongated hole 9 and the third elongated hole 11 as seen in height direction H, so that accordingly the first connecting element 6 is also arranged at least partially above the second connecting element 8 and the third connecting element 10, whereby further undesired movements can be prevented.

Preferably, the first connecting element 6 is arranged in front of the second connecting element 8 and the third connecting element 10 as seen in the longitudinal direction L, so that tilting of the seat depth adjustment element 5 can be prevented.

Figure 3A:
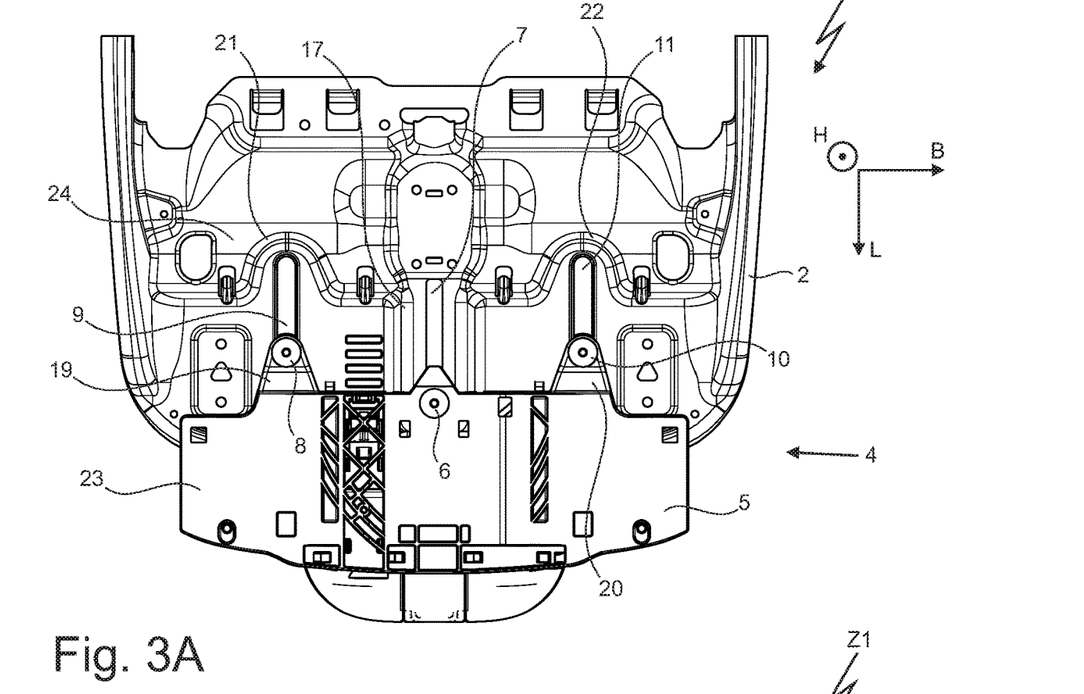
FIG. 3A Seat part frame and seat depth adjustment of the vehicle seat according to FIG. 2A in a top view.
Figure 3B:
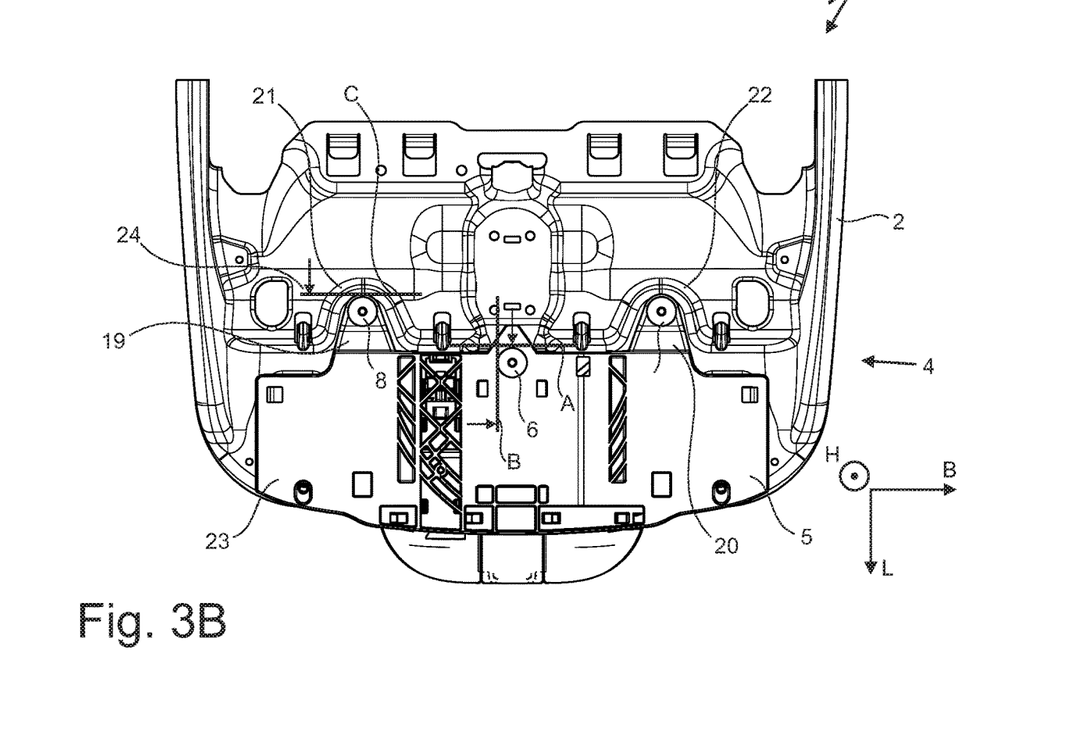
FIG. 3B Seat part frame and seat depth adjustment of the vehicle seat according to FIG. 2B in a top view.

FIG. 3A shows a top view of FIG. 2A and FIG. 3B a top view of FIG. 2B.

Because the connecting elements 6, 8, 10 are offset in longitudinal direction L, the elongated holes 7, 9, 11 are also offset from one another in longitudinal direction L. For this purpose, it is conceivable that a first offset element 19 is provided for the second connecting element 8 and a second offset element 20 is provided for the third connecting element 10 of the seat depth adjustment element 5 in order to achieve an offset in the longitudinal direction L with respect to the first connecting element 6.

Accordingly, a first bulge of the seat part frame 2 is therefore also provided for the second offset element 19 and a second bulge of the seat part frame 2 is provided for the third offset element 20 in order to be able to provide all components in a space-saving manner.

This is due to the fact that a first mounting surface 23 of the seat depth adjustment element 5 is provided on which a seat cushion, a seat cover or the like is to be applied in order to be able to provide a seating surface. In order to be able to achieve a seat surface that is as stepless as possible, a second mounting surface 24 of the seat part frame 2 is provided, which is arranged essentially at the same height as the first mounting surface 23, as seen in the height direction H. The second mounting surface 24 of the seat depth adjustment element 5 is provided with a seat cushion, a seat cover or the like to be able to provide a seat surface.

Preferably, the second connecting element 8 and the third connecting element 10 are substantially the same in terms of position in the longitudinal direction L and height direction H.

The connecting elements 6, 8, 10 are essentially the same and are described in more detail in connection with FIGS. 4A to 4C.

Figure 4A:
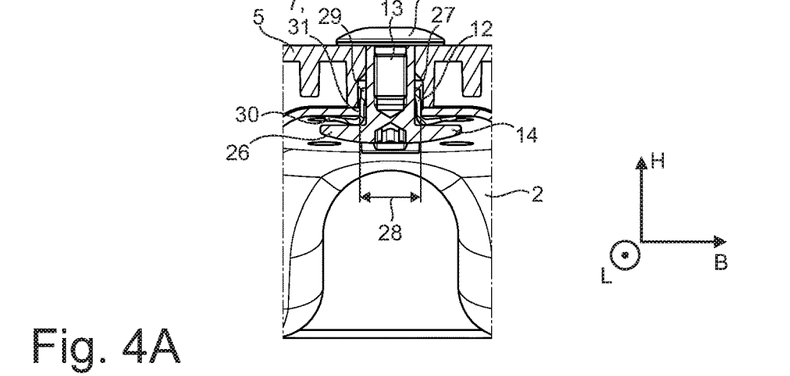
FIG. 4A Section along axis A of FIG. 3B.
Figure 4B:
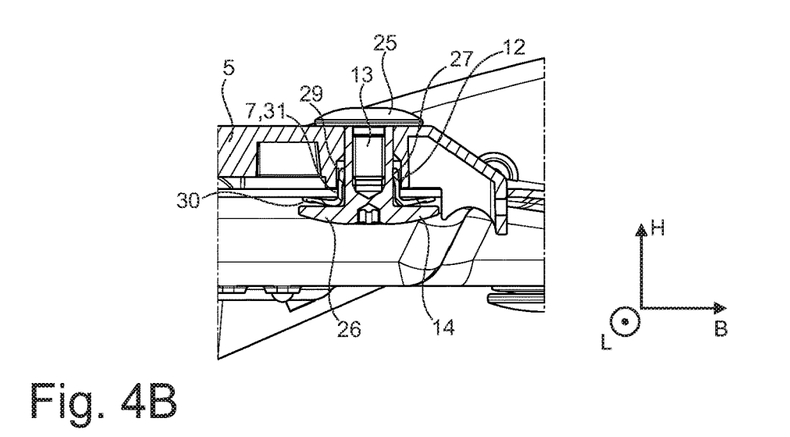
FIG. 4B Section along axis B of FIG. 3B.
Figure 4C:
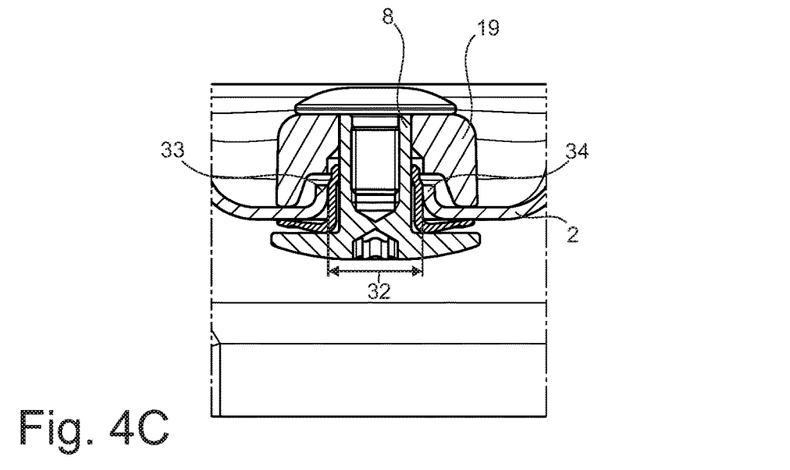
FIG. 4C Section along axis C of FIG. 3B.

FIG. 4A shows a section of a portion of FIG. 3B along axis A, FIG. 4B shows a section of a portion of FIG. 3B along axis B, and FIG. 4C shows a section of a portion of FIG. 3B along axis C.

The connecting element 6, 8, 10 has a first connecting element part 13 with a first connecting portion 25 and a second connecting element part 14 with a second connecting portion 26. The connecting element parts 13, 14 are connected to each other, preferably screwed together. The first connecting section 25 is directly connected to the seat depth adjustment element 5, the second connecting portion 26 being indirectly connected to the seat part frame 2 by means of a first spring unit 12. The first connecting portion 25 is arranged above the second connecting portion 26. The connecting element 6, 8, 10 extends through the elongated hole 7, 9, 11.

FIG. 4A shows the first connecting element 6, which is designed as a fixed bearing. The fixed bearing therefore only allows movement along the elongated hole 7.

The first spring element 12 is designed as a disc spring unit which is arranged circumferentially around the first connecting element 6 and is rigidly connected to the first connecting element 6 by means of a connecting area 27. The first spring element is in operative contact with the seat part frame 2. The disc spring unit has a first portion 29 and a second portion 30, the first portion 29 being connected to the first connecting element 6 and extending through the first elongated hole 7 and being in contact with an inner side 31 of the first elongated hole 7. The second portion 30 joins the first portion 29 and extends radially to the height direction H, the second portion 30 being connected to the seat part frame 2 and the second connecting portion 26.

A first width 28 of the elongated hole 7 is such that when the first spring element 12 is inserted, the first spring element 12 is compressed in the width direction B, i.e. a spring force is produced in the width direction B and the first connecting element 6 is not movable in the width direction B. The extension of the first spring element 12 in the width direction B in an unloaded state is therefore greater than the extension of the first elongated hole 7 in the width direction B.

The first spring unit 12 is preferably rotationally symmetrical.

FIG. 4B shows a section along axis B.

FIG. 4C shows a section along axis C, so that the second connecting element 8 is shown. The same explanations regarding this FIG. 4C also apply to the third connecting element 10.

As can be seen, the first offset element 19 is partially recognisable, whereby the first offset element 19 is slidingly connected to the seat part frame 2. A second width 32 of the second elongated hole 9 is thereby such that the second width 32 of the extension of the first spring element 12 in width direction B in an unloaded state corresponds to the extension of the second elongated hole 9 in width direction B, i.e. that the spring element 12 is unloaded. It is therefore conceivable that the spring element 12 of the second connecting element 8 can be subjected to a force in order to be able to compensate for manufacturing tolerances in the width direction B. For this purpose, the first offset element 19 is also formed at a distance from the second elongated hole 8 in width direction B, so that a movement in width direction B is basically possible.

The second elongated hole 8 has a first portion 33 and a second portion 34, which are spaced apart from each other in the width direction B, and extend at least partially in the height direction H and overlap with the first offset element 19 as seen in the width direction B.

Because movement of the second connecting element 8 is possible in the longitudinal direction L and in the width direction B, the second connecting element 8 is a floating bearing.

Figure 5A:
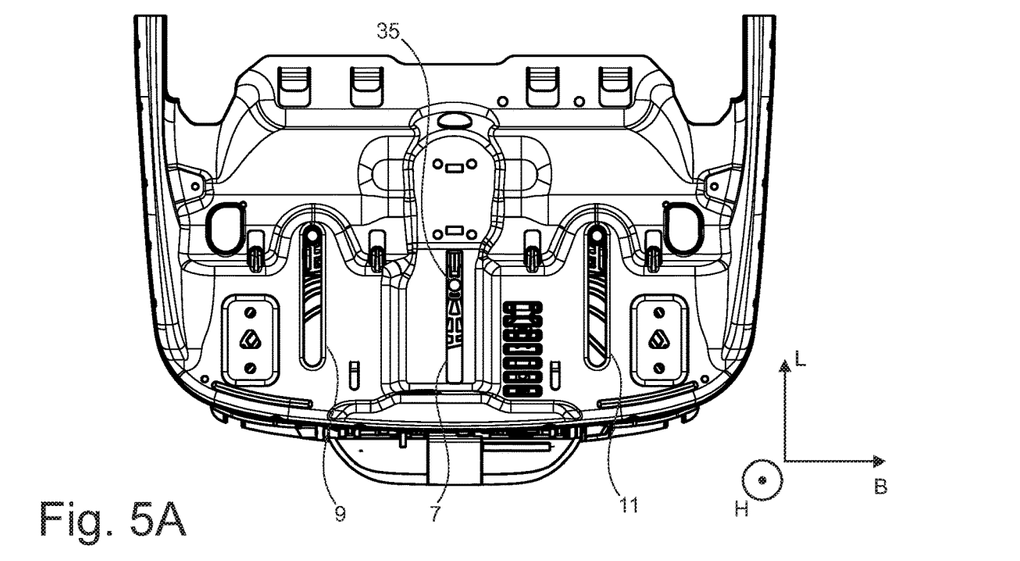
FIG. 5A Seat part frame and seat depth adjustment of the vehicle seat in a top view according to a further embodiment.
Figure 5B:
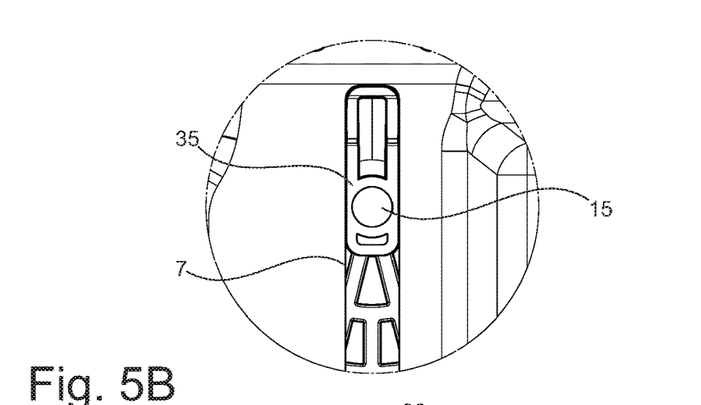
FIG. 5B Detail view of FIG. 5A.
Figure 5C:
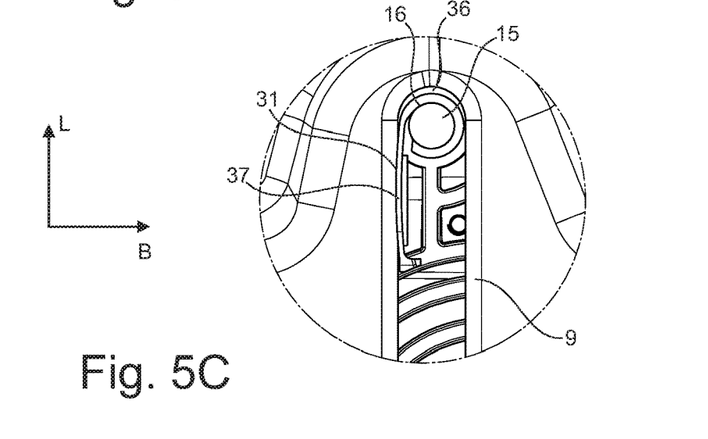
FIG. 5C Detail view of FIG. 5A.

FIGS. 5A to 5C show an alternative embodiment, wherein the seat part frame 2 comprises a first elongated hole 7 and the seat depth adjustment element 5 comprises a first guide element 35, wherein the first guide element 35 is configured to be guided in the first elongated hole 7, wherein further a first connecting element 6 is provided, wherein the first connecting element 6 extends through the first elongated hole 7 and connects the seat depth adjustment element 5 to the seat part frame 2.

The first guide element 35 is formed integrally with the seat depth adjustment element 5. Preferably, the first guide element 35 is formed complementary to the first elongated hole 7 at least in width direction B. This means that no movement of the first guide element 35 in width direction B is possible, so that the first guide element 35 is described as a fixed bearing according to FIGS. 5A to 5C.

The first guide element 35 has a through opening 15 which extends in the height direction H. The passage opening 15 is formed in such a way that the first connecting element 6 can extend through the through opening 15.

With regard to the second elongated hole 9 and analogously to the third elongated hole 11, the seat depth adjustment element 5 has a second spring element 15 and a third spring element 40, respectively, which are each preferably also formed as an integral part of the seat depth adjustment element 5. The second spring element 15 as well as the third spring element 40 has a first end 36 and a second end 37, wherein the first end 36 is arranged around a through-opening 15, respectively represents the through opening 15. The second end 37 is formed as a leg, similar to a leg spring, and contacts the second elongated hole 9 on the inside 31. The second end 37 extends in the longitudinal direction L and has a bend in the width direction B, which is operatively connected to the second elongated hole 9, so that a movement in the width direction B is possible; a floating bearing is described.

Figure 6A:
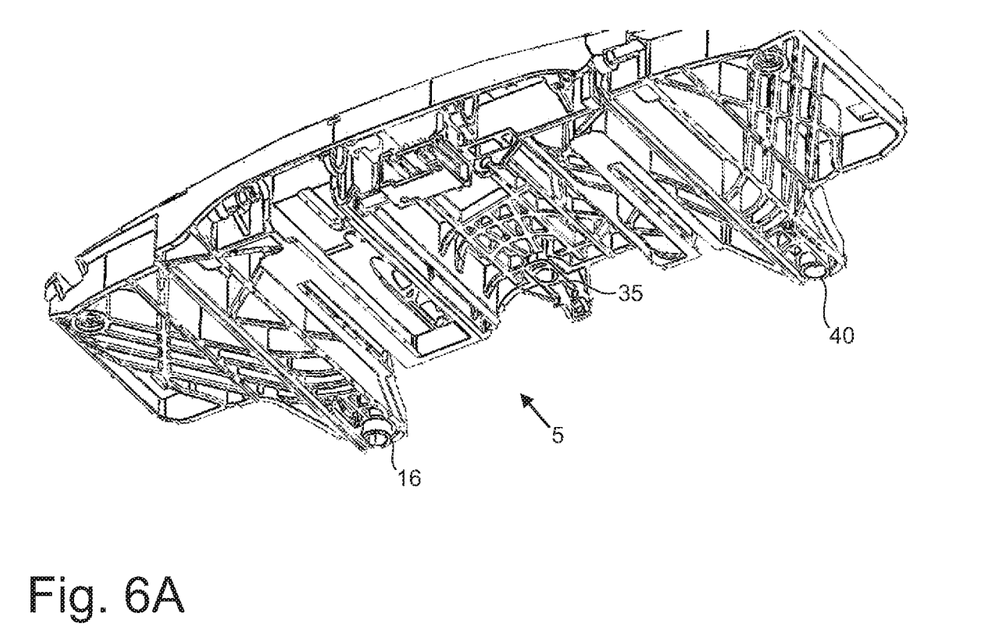
FIG. 6A Perspective bottom view of the seat depth adjustment according to FIG. 5A.
Figure 6B:
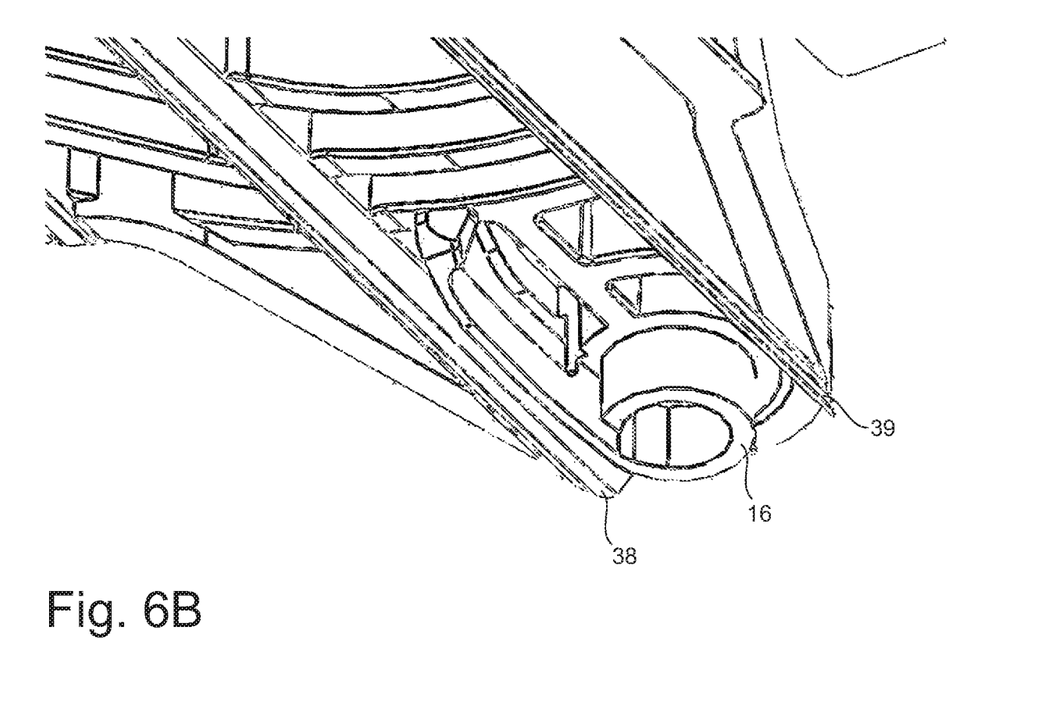
FIG. 6B Detail view of FIG. 6A.

FIGS. 6A and 6B show a perspective bottom view of the alternative embodiment. The second spring elements 16 with respect to the second elongated hole 9 and the third elongated hole 11 are arranged mirrored to each other with respect to the longitudinal axis L.

FIG. 6B shows a close-up view of the second spring element as described. Further, a first guide 38 and a second guide 39 are shown, which can interact with upwardly directed portions 33, 34 of the corresponding oblong hole 9 when moving in width direction B.

The sections 33, 34 are thus arranged between the guides 38, 39 and the second spring element 16.

All features disclosed in the application documents are claimed as essential to the invention, provided that they are individually or in combination new compared to the prior art.

LIST OF REFERENCE SIGNS

1 Vehicle seat
2 Seat part frame
3 Backrest frame
4 Seat depth adjustment
5 Seat depth adjustment element
6 First connecting element
7 First elongated hole
8 Second connecting element
9 Second elongated hole
10 Third connecting element
11 Third elongated hole
12 First spring unit
13 First connecting element part
14 Second connecting element part
15 Through opening
16 Second spring element
17 Seat depth adjustment unit guide
18 Upper surface
19 First offset element
20 Second offset element
21 First bulge
22 Second bulge
23 First mounting surface
24 Second mounting surface
25 First connection section
26 Second connection section
27 Connecting area
28 First width
29 First portion
30 Second portion
31 Inner side
32 Second width
33 First portion
34 Second portion 35 First guide element
36 First end
37 Second end
38 First guide
39 Second guide
40 Third spring element
Z1 First state
Z2 Second state
H Height direction
L Longitudinal direction
B Width direction

What is claimed is:

1. A vehicle seat, comprising:
a seat part frame;
a seat depth adjustment with a seat depth adjustment element, wherein the seat depth adjustment element is displaceable relative to the seat part frame;
a first connecting element, wherein the first connecting element connects the seat depth adjustment element to the seat part frame and guides the seat depth adjustment element relative to the seat part frame; and
a first spring unit, wherein the first spring unit at least partially surrounds the first connecting element in a circumferential direction, the first spring unit being operatively connected to the seat part frame and to the first connecting element at least in such a way that a spring force acts on the first connecting element and on the seat part frame, and wherein first spring unit is a disc spring unit.

2. The vehicle seat according to claim 1, wherein the seat part frame has a first elongated hole, wherein the first connecting element extends through the first elongated hole and wherein the first connecting element is guided by the first elongated hole.

3. The vehicle seat according to claim 1, wherein the first spring unit is made of a plastic.

4. The vehicle seat according to claim 1, wherein the first connecting element is formed from a first connecting element part and a second connecting element part, and wherein the first connecting element part and the second connecting element part are connected to one another.

5. The vehicle seat according to claim 2, further comprising:
a second connecting element; and
a third connecting element, wherein the second connecting element and the third connecting element connect the seat depth adjustment element to the seat part frame and guide the seat depth adjustment element with respect to the seat part frame, and wherein the seat part frame has a second elongated hole and a third elongated hole, wherein the second connecting element extends through the second elongated hole, wherein the second connecting element is guided by the second elongated hole, wherein the third connecting element extends through the third elongated hole, and wherein the third connecting element is guided by the third elongated hole.

6. The vehicle seat according to claim 1, wherein the seat part frame has a first elongated hole, and wherein the first elongated hole extends in a longitudinal direction.

7. The vehicle seat according to claim 5, wherein the first elongated hole, the second elongated hole and the third elongated hole are arranged parallel to each other.

8. The vehicle seat according to claim 1, wherein the first connecting element is formed from a first connecting element part and a second connecting element part, the first connecting element part and the second connecting element part being positively connected to one another.

9. A vehicle seat, comprising:
a seat part frame; and
a seat depth adjustment with a seat depth adjustment element, wherein the seat depth adjustment element is displaceable relative to the seat part frame-,
wherein the seat part frame has a first elongated hole and the seat depth adjustment element has a first guide element, wherein the first guide element is designed to be guided in the first elongated hole;
a first connecting element, wherein the first connecting element extends through the first elongated hole and connects the seat depth adjustment element to the seat part frame; and
a first spring unit, wherein the first spring unit at least partially surrounds the first connecting element in a circumferential direction, the first spring unit being operatively connected to the seat part frame and to the first connecting element at least in such a way that a spring force acts on the first connecting element and on the seat part frame, wherein first spring unit is a disc spring unit.

10. The vehicle seat according to claim 9, wherein the first guide element has a first through opening through which the first connecting element is at least partially received.

11. The vehicle seat according to claim 9, wherein a second connecting element and a third connecting element are provided, which are provided and designed to connect the seat depth adjustment element to the seat part frame and to guide the seat depth adjustment element with respect to the seat part frame, wherein the seat part frame has a second elongated hole and a third elongated hole, wherein the second connecting element extends through the second elongated hole wherein the second connecting element is guided by the second elongated hole, wherein the third connecting element extends through the third elongated hole and wherein the third connecting element is guided by the third elongated hole.

12. The vehicle seat according to claim 11, wherein a second spring element is provided, the second spring element having a first end and a second end, the first end being fixedly connected to the seat depth adjustment element and the second end being in operative contact with the second elongated hole in such a way that a tolerance of the seat depth adjustment element with respect to the second elongated hole can be compensated.

13. The vehicle seat according to claim 11, wherein a second spring element and a third spring element are provided, the second spring element having a first end and a second end, the first end being fixedly connected to the seat depth adjustment element and the second end being in operative contact with the second elongated hole in such a way that a tolerance of the seat depth adjustment element relative to the second elongated hole can be compensated, wherein the third spring element has a first end and a second end, and wherein the first end is fixedly connected to the seat depth adjustment element and the second end is in operative contact with the third elongated hole in such a way that a tolerance of the seat depth adjustment element to the third elongated hole can be compensated.

* * * * *